United States Patent
Williams et al.

(10) Patent No.: US 6,886,954 B2
(45) Date of Patent: May 3, 2005

(54) SYSTEM AND METHOD FOR PROCESSING LIGHT IN AN ELECTRONIC DISPLAY SYSTEM

(75) Inventors: David L Williams, Newark, CA (US); James P. Kardach, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 31 days.

(21) Appl. No.: 10/326,162

(22) Filed: Dec. 23, 2002

(65) Prior Publication Data

US 2004/0120137 A1 Jun. 24, 2004

(51) Int. Cl.$^7$ ................................................. F21V 9/14
(52) U.S. Cl. .......................... 362/19; 362/31; 362/558; 362/559; 362/560; 362/561; 362/217; 359/494; 359/487
(58) Field of Search .............................. 359/494, 487, 359/599, 483, 485; 362/19, 31, 558, 559, 560, 561, 583, 217

(56) References Cited

U.S. PATENT DOCUMENTS

| | | | | |
|---|---|---|---|---|
| 5,805,337 A | * | 9/1998 | Yoshida | 359/495 |
| 5,828,471 A | * | 10/1998 | Davis et al. | 359/15 |
| 6,663,262 B2 | * | 12/2003 | Boyd et al. | 362/296 |

* cited by examiner

Primary Examiner—Sandra O'Shea
Assistant Examiner—Sharon Payne
(74) Attorney, Agent, or Firm—Kenyon & Kenyon

(57) ABSTRACT

Embodiments of the present invention relate to a device for polarizing light in a backlighting system of an electronic display to conserve energy. Embodiments of the invention may comprise an optically transparent material that includes an interface therein to separate randomly polarized light into vertically polarized and horizontally polarized components. The optically transparent material may have a re-polarizing layer thereon to change a polarization of one of the separated components, and a reflective edge disposed at an angle substantially parallel to the interface.

21 Claims, 7 Drawing Sheets

SYSTEM AND METHOD FOR PROCESSING LIGHT IN AN ELECTRONIC DISPLAY SYSTEM

FIELD OF THE INVENTION

Embodiments of the present invention relate to a device for improving the efficiency of electronic display systems, and more particularly to a device for polarizing light from a light source to efficiently distribute light in a display system.

BACKGROUND OF THE INVENTION

Many electronic displays use a backlighting system. FIG. 1 is a partial perspective view showing two elements of a backlighting system: a backlight diffuser or waveguide 100, and a light source 101. In a typical backlighting system, diffuser 100 is arranged behind a display screen (not shown) to direct light from light source 101 toward the display screen. Light source 101 is located near a wide end of diffuser 100, which tapers in width as it extends across the display screen. Light 102 enters the wide end of diffuser 100, and light-scattering centers 103 in diffuser 100 re-direct light 102 toward the display screen in order to concentrate the light energy there. This kind of arrangement is useful in thin, flat display systems, such as are used in, for example, laptop or "notebook" computers, among other reasons because it economizes on space.

FIG. 2 shows diffuser 100 and light source 101 as they might be used in conjunction with other parts of one kind of conventional electronic display system. FIG. 2 is an orthogonal view of the "top" of the system. In FIG. 2, light 102 from light source 101 is re-directed by diffuser 100 through vertical polarizer 200, a first glass member 201, a liquid crystal spatial light modulator 202, color absorption filters 203, a second glass member 204, and horizontal polarizer 205. The light passing through horizontal polarizer 205 (represented in FIG. 2 by the arrows numbered 206–208) is typically what a user of the display system sees.

The operation of elements 200–205 is as follows. Light 102 from light source 100, and consequently light 102 directed by diffuser 100 toward vertical polarizer 200, is typically "unpolarized" or "randomly polarized," in that it comprises both vertically polarized light and horizontally polarized light. Vertical polarizer 200 blocks horizontally polarized light in light 102, allowing only vertically polarized light in light 102 to pass through. Next, elements 201–204 further process the vertically polarized light allowed through by vertical polarizer 200. Elements 201–204 constitute one possible embodiment of a "TFT matrix" (thin film transistor matrix) such as is used in many liquid crystal displays. Glass member 201 may be covered with an ITO (indium tin oxide) film which may be used to apply electric fields to liquid crystal in liquid crystal spatial light modulator 202. By application of the appropriate electric field, the orientation of the liquid crystal can be changed to cause the polarization of light that enters the liquid crystal to be changed. That is, when an electric field in one direction is applied to the liquid crystal, the orientation of the liquid crystal will cause vertically polarized light entering one side of the liquid crystal to exit the other side as horizontally polarized light. On the other hand, when an electric field in another direction is applied to the liquid crystal, the orientation of the liquid crystal will have no polarization effect on entering light. In other words, vertically polarized light entering the liquid crystal will exit as vertically polarized light.

The liquid crystal corresponds to pixels. Thin film transistors on glass member 204 control whether the electric field applied to liquid crystal corresponding to a given pixel is changed or not. Horizontal polarizer 205 will block vertically polarized light, allowing only horizontally polarized light to pass through. Thus, by appropriately switching transistors, the light that reaches a viewer of a display screen can be controlled. More specifically, by appropriately switching the transistor of a given pixel, vertically polarized light passed through by vertical polarizer 200 will be changed to horizontally polarized light, and be passed through by horizontal polarizer 205, to reach a viewer. On the other hand, by appropriately switching the transistor of a given pixel, vertically polarized light passed through by vertical polarizer 200 will remain vertically polarized, and be blocked by horizontal polarizer 205.

Color absorption filters 203 control what wavelengths of light are allowed to pass through to a viewer. Thus, for example, light 206 represents a wavelength corresponding to a red color, light 207 represents a wavelength corresponding to a green color, and light 208 represents a wavelength corresponding to a blue color. Using the above-described polarization techniques, the number and intensity of outputs from pixels can be controlled so as to, in combination with color absorption filters 203, produce any desired image in terms of the aggregate effect on the viewer.

As noted earlier, the foregoing arrangement is useful in thin, flat displays because it economizes on space. That is, light from a typically thin, elongated light source such as a fluorescent tube or LED (light-emitting diode) bar can be distributed by a diffuser across a comparatively wide area. However, inefficiencies exist in the above-described system. For example, because approximately half of randomly polarized light is horizontally polarized, vertical polarizer 200 absorbs approximately half of the energy in light 102 directed toward it by diffuser 100. This means that a significant amount of the power applied to generate light source 100 is wasted. Consequently, other systems may be power-starved, or power sources must be made physically larger to compensate. Such physically larger power sources are especially undesirable in applications that use thin displays, since space is typically at a premium.

An approach is needed to address the above concerns.

BRIEF DESCRIPTION OF THE INVENTION

DETAILED DESCRIPTION

Embodiments of the present invention relate to a device for polarizing light in a backlighting system to conserve energy. According to the embodiments, randomly polarized light from the light source may be processed to convert it to vertically polarized light before it reaches the diffuser, so that most of the light that the diffuser subsequently directs toward the vertical polarizer is already vertically polarized. In this way, the vertical polarizer passes most of the light that is incident upon it from the diffuser, rather than absorbing about half of the light (i.e., the portion of the randomly polarized light that is horizontally polarized) as described above. Thus, the same brightness of a display can be achieved at a lower power than in known systems, since the light source need not generate as much light. This advantage may be especially beneficial in, for example, portable computer systems such as laptops and notebook computers, which run on batteries. In notebook systems, for example, backlighting can consume as much as 30% of the total power.

Accordingly, embodiments of the invention may comprise an optically transparent material that includes an interface therein to separate randomly polarized light into vertically polarized and horizontally polarized components. The optically transparent material may have a re-polarizing layer thereon to change a polarization of one of the separated components, and a reflective edge to reflect the other separated component. In embodiments, the reflective edge may be disposed at an angle substantially parallel to the interface. More specifically, the re-polarizing layer may convert the horizontally polarized component into vertically polarized light, and the reflective edge may reflect the vertically polarized component. Both the converted horizontally polarized component and the reflected vertically polarized component may then be directed into a diffuser.

Figure 1:
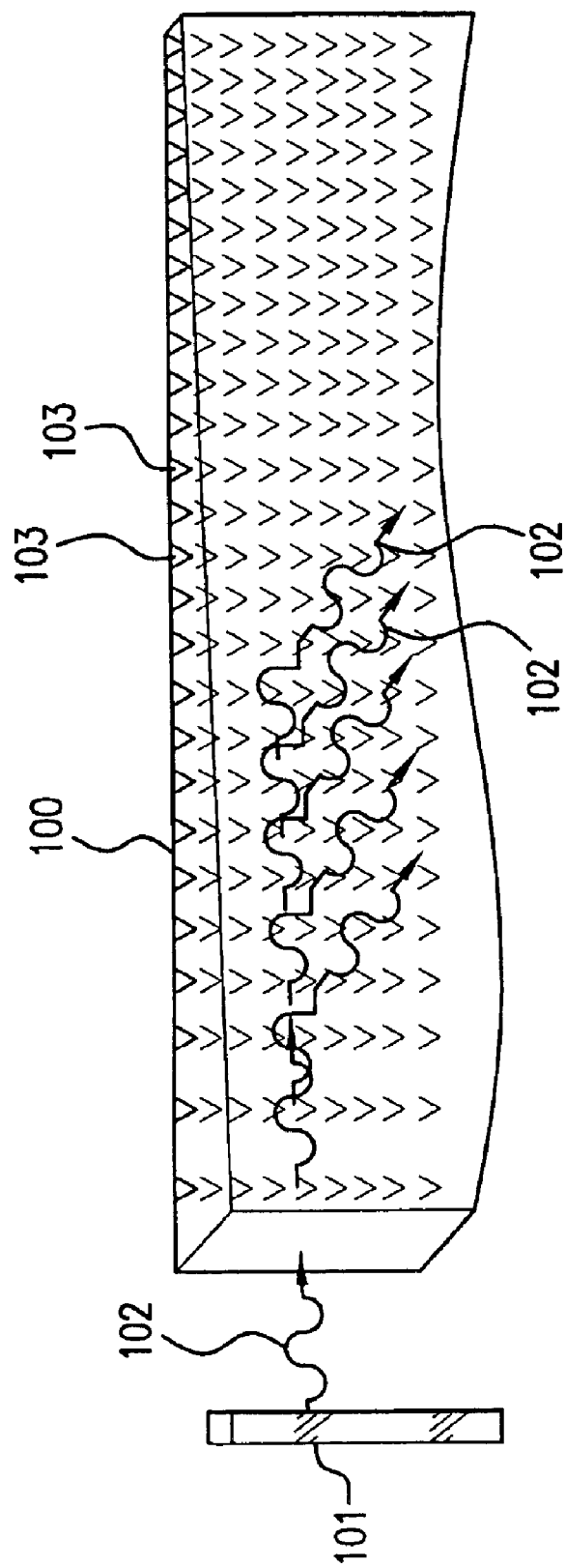
FIG. 1 shows elements of a backlighting system of an electronic display.
Figure 2:
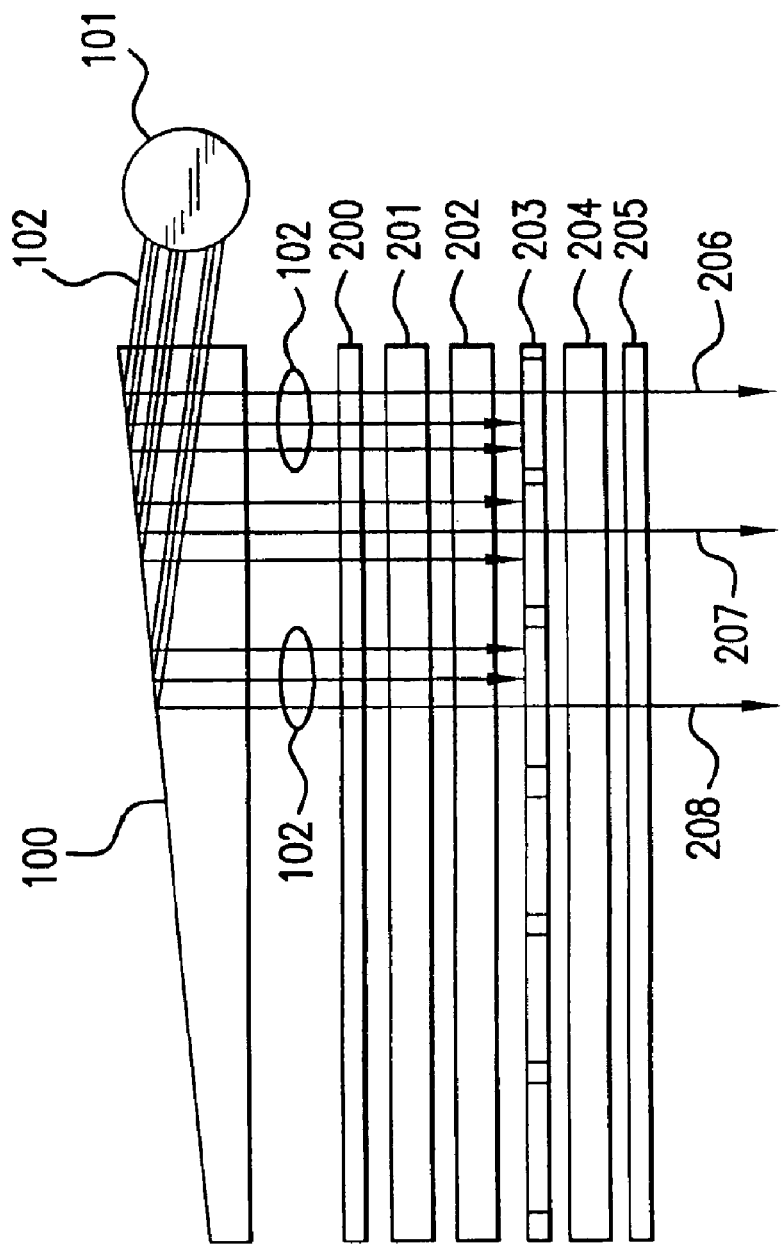
FIG. 2 illustrates the operation of one kind of known electronic display system with backlighting.
Figure 3A:
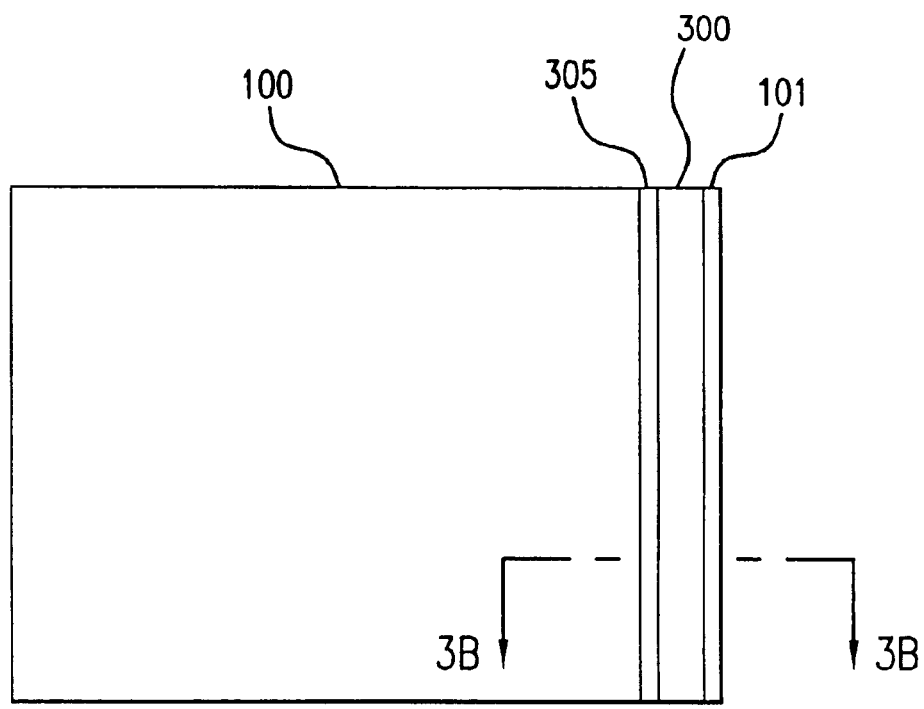
FIGS. 3A–3C are views of pre-polarizing elements according to embodiments of the present invention, in use in a backlighting system.
Figure 3B:
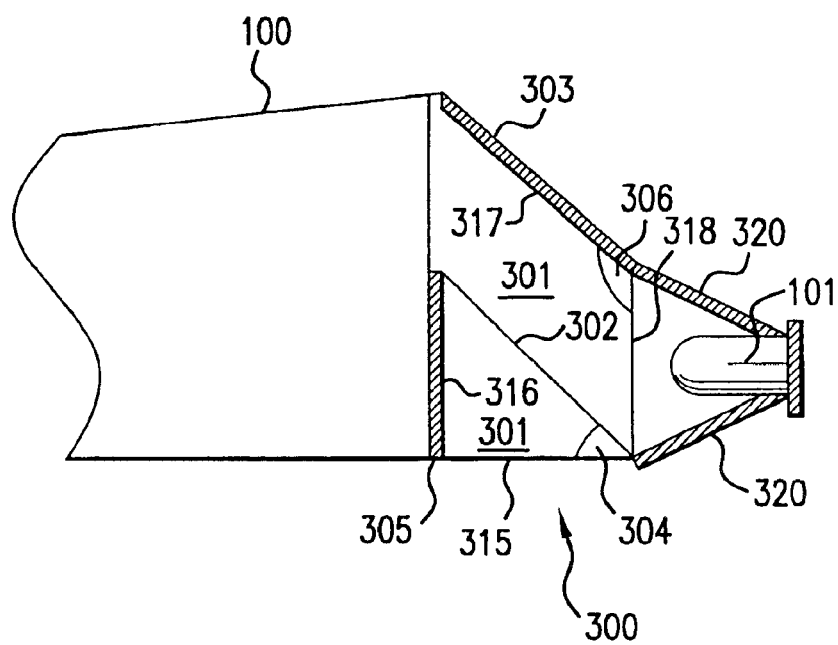

Embodiments of the invention are illustrated in FIGS. 3A and 3B. FIG. 3A shows an orthogonal view of the "front" of a backlighting system that includes elements of the present invention. Diffuser 100 is as discussed above in connection with FIGS. 1 and 2 in this example. In the view of FIG. 3A, light can be thought of as being directed from the face of the diffuser out the plane of the page. Light source 101 is also as discussed earlier; i.e., a thin, elongated device such as a fluorescent tube or LED bar. However, according to embodiments of the invention, pre-polarizing elements 300 and 305 are arranged between light source 101 and diffuser 100.

FIG. 3B is an enlarged, partial cross-section of FIG. 3A which shows pre-polarizing elements 300 and 305 in more detail. As explained below, element 300 may function as a light-separating element while element 305 functions as a re-polarizing element or layer. In embodiments, light-separating element 300 may comprise an optically transparent material 301 having a boundary or interface 302 therein. Interface 302 may be at a predetermined angle 304 relative to a first outer edge 315 of optically transparent material 301. A second outer edge 316 of optically transparent material 301 may have re-polarizing layer 305 thereon; in embodiments, re-polarizing layer 305 may be a half-wave plate as described in more detail below. A third outer edge 317 of optically transparent material 301 may have a reflective material 303 thereon.

Light emitted from light source 101 may be incident on an incident edge 318 of optically transparent material 301. Incident edge 318 may be at substantially a right angle (90°) to first outer edge 315. Reflective material 303 may be substantially parallel to interface 302; i.e., angle 306 may be substantially equal to angle 304 plus 90°. Light source 101 could be set within a parabolic reflector such as are used, for example, in flashlights, having fins or flanges 320 to focus the emitted light.

Figure 3C:
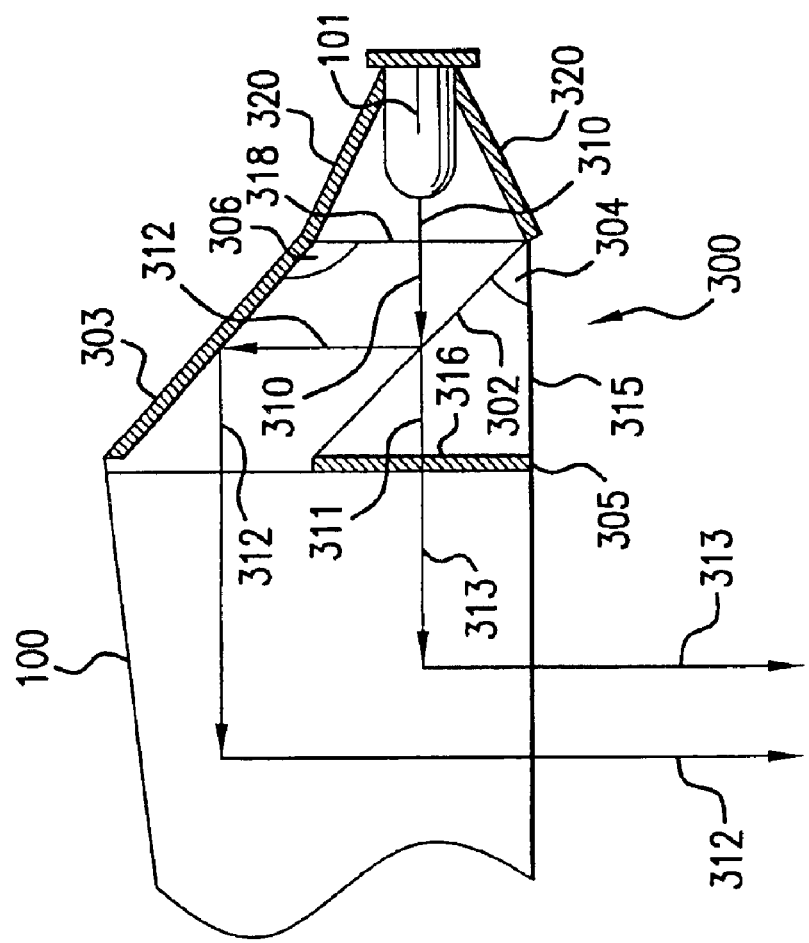

FIG. 3C illustrates the operation of pre-polarizing elements 300 and 305. Light source 101 emits randomly polarized light 310; that is, light 310 is about half vertically polarized light and about half horizontally polarized light. Light 310 is incident on interface 302. Through a known optical effect related to the angle of incident light 310 relative to interface 302, and discussed in more detail below, interface 302 allows horizontally polarized light 311 to pass through, but reflects vertically polarized light 312. Then, re-polarizing layer 305, as further explained below, converts horizontally polarized light 311 to vertically polarized light 313, which then enters diffuser 100. The vertically polarized light reflected by interface 302 is again reflected by reflective material 303 and also enters diffuser 100. Consequently, most of the light that enters diffuser 100 is vertically polarized. Thus, when diffuser 100 directs light 312 and 313 into a vertical polarizer of an electronic display system, most of light 312 and 313 passes through the vertical polarizer. In contrast, without the pre-polarizing operation of elements 300 and 305, about half of the light 310 emitted by light source 100 would have been blocked by the vertical polarizer, wasting energy as described earlier.

A further explanation of the optical effects which enable the pre-polarizing operations described above follows. As is well known, light may be viewed as a transverse wave made up of interacting electric and magnetic fields. The electric and magnetic fields oscillate as a light wave propagates in a given direction. Typically, the directions of the electric field, the magnetic field, and the direction of propagation of the light are all mutually perpendicular. In an orthogonal representation as in, for example, FIG. 3C, if the electric field of the light is oscillating perpendicular to the plane of the figure, the light is termed vertically polarized or s-polarized. If, on the other hand, the electric field is oscillating in the plane of the figure, the light is termed horizontally polarized or p-polarized.

When randomly polarized light is incident at an angle known as "Brewster's angle" on an interface between two optically transparent materials with respective refractive indexes $\eta_1$ and $\eta_2$, light which has a direction of polarization which is parallel to a normal to the interface surface (i.e., p-polarized or horizontally polarized light) will experience no reflection and will all be transmitted through the interface. On the other hand, light which has a direction of polarization which is perpendicular to a normal to the interface surface (i.e., s-polarized or vertically polarized light) will experience some reflection. Brewster's angle, in the general case, is given by $\theta_B = \arctan(\eta_2/\eta_1)$, where $\eta_1$ and $\eta_2$ are the respective refractive indexes of two optically transparent materials.

Figure 4:
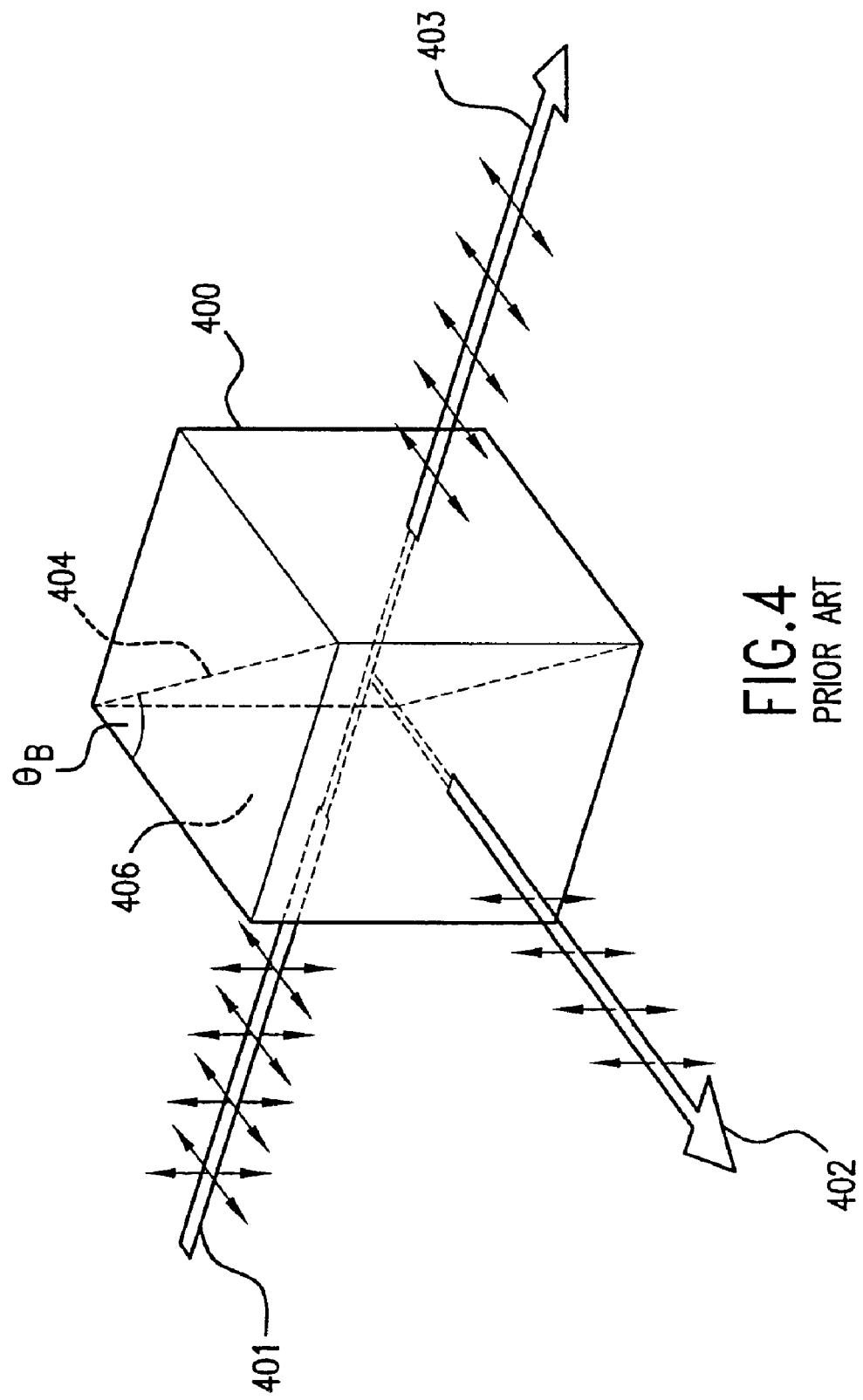
FIG. 4 illustrates the separation of horizontally and vertically polarized components in randomly polarized light by a box prism.

FIG. 4 shows a "box" or "cube" prism 400, which uses the known effect of Brewster's angle to separate orthogonal polarizations. In FIG. 4, randomly polarized light 401 may be assumed to be incident at approximately right angles to a cube face 406. By locating interface 404 at approximately Brewster's angle $\theta_B$ relative to cube face 406 upon which randomly polarized light 401 is incident, interface 404 will pass horizontally polarized light 403 while reflecting vertically polarized light 402 substantially 90°. (Interface 404 may thus also be known as a "beam splitting face.").

A half-wave plate is a known device that can be used to "flip" or rotate the polarization of linearly polarized light. A half-wave plate may be made of a "birefringent" material. A birefringent material is one in which two orthogonal polarizations of light travel at different speeds. Thus, a half-wave plate, more specifically, may be a layer of birefringent material that delays one of the electric field or magnetic field in a light wave relative to the other by a half-wave, effectively flipping the polarization of the light wave from horizontal to vertical or vice versa.

Figure 5A:
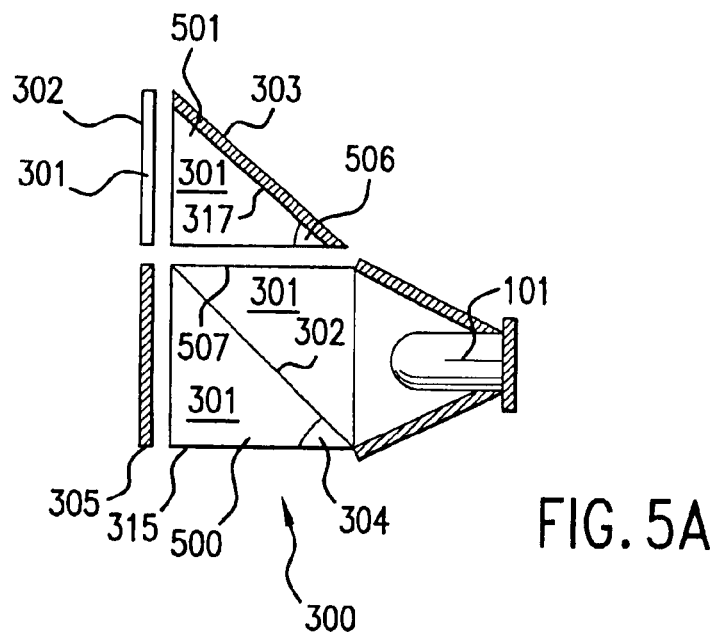
FIGS. 5A–5C illustrate alternative embodiments of the present invention.
Figure 5B:
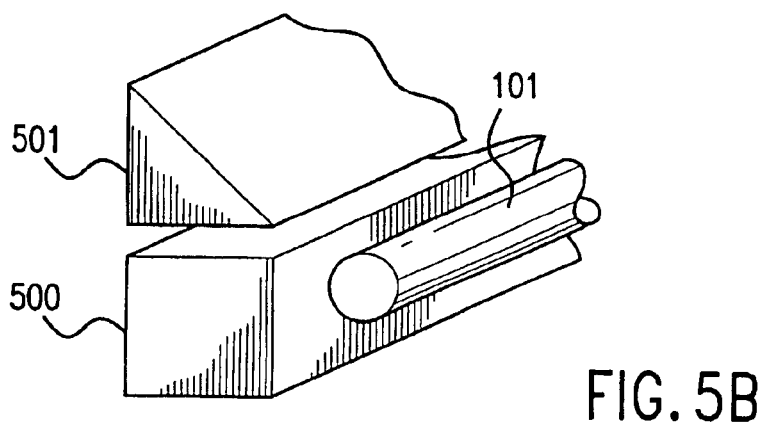
Figure 5C:
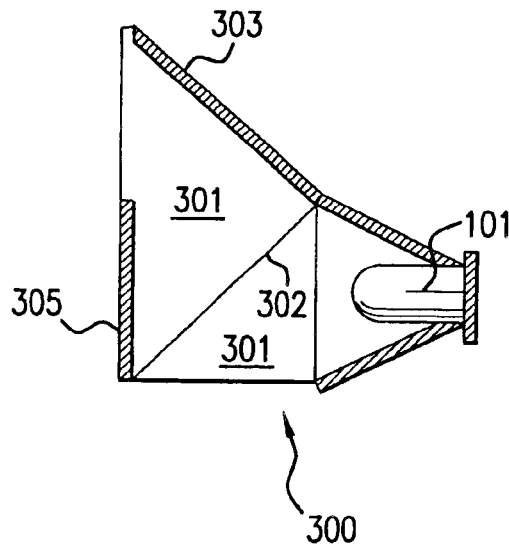

In view of the foregoing, FIGS. 5A–5C illustrate possible embodiments of the invention. A light separating element corresponding to element 300 as shown in previous figures could comprise a box prism 500 made of an optically transparent material 301 and having an interface 302 therein. Interface 302 could be disposed at an angle 304 relative to an outer face or edge 315 of box prism 500. Angle 304 could be substantially equal to Brewster's angle for the material.

Pre-polarizing element 300 could further comprise a separate member 501 made of optically transparent material 301 of the same refractive index as the material of box prism 500. Box prism 500 and member 501 could be made of, for example, glass or plastic, and bonded together. Member 501 may have an outer face or edge 317 disposed at an angle 506 so as to make edge 317 substantially parallel to interface 302 when member 501 is brought into abutment with an abutting edge 507 of box prism 500. A reflective material 303 may be bonded to edge 317 of member 501. The reflective material could include, for example, aluminum or silver.

Re-polarizing layer 305 could comprise a half-wave plate as described above. A spacer 502 could be arranged adjacent to re-polarizing layer 305 so as to fill in a gap between member 501 and a diffuser, so that pre-polarizing element 300 abuts the diffuser smoothly.

FIG. 5B shows a partial perspective view of box prism 500 and member 501, to illustrate that according to embodiments these could be elongated so as to approximately parallel, along its length, a long narrow light source 101 such as a fluorescent bulb in a backlighting system as described above.

FIG. 5C illustrates a possible embodiment wherein the optically transparent portion of pre-polarizing element 300 does not comprise separate members 500 and 501 as shown in FIG. 5A, but instead is formed by a unitary member, such as a single piece of molded plastic. Such an embodiment could eliminate the need for a separate spacer 502.

It should be understood that, in possible embodiments, pre-polarizing element 300 need not necessarily be made of material with a single refractive index. Depending on the geometries of particular applications or other factors, it could be convenient to utilize materials of differing refractive indexes, yielding a range of differing Brewster's angles, so long as the function of splitting randomly polarized light into horizontally polarized and vertically polarized components was achieved.

Additionally, in possible embodiments, the light-separating function of pre-polarizing element 300 may not necessarily utilize a box prism. Optically transparent materials of other shapes will also separate randomly polarized light into vertically polarized and horizontally polarized components, provided the materials have therein an interface upon which light can be made incident at Brewster's angle for the given material. Further, other spatial relationships between elements than those explicitly illustrated are possible. For example, a reflective edge need not necessarily be parallel to the light-separating interface, but could instead be placed as needed in a given application, to reflect a given component of the separated light, whether vertically polarized or horizontally polarized, in a desired direction.

Further, it is possible the role of the re-polarizing element could be reversed. That is, it could be convenient for a given application to convert randomly polarized light into mostly horizontally polarized light, as opposed to mostly vertically polarized light as described above. In such an application, for example, randomly polarized light might be separated as shown in FIG. 3C, but re-polarizing layer 305 might be arranged to intercept vertically polarized light 312 rather than horizontally polarized light 311, to convert vertically polarized light 312 into horizontally polarized light.

Moreover, it should be understood that while FIG. 2 as described above represents one kind of display system that uses backlighting and which would benefit by application of the principles of the present invention as described herein, FIG. 2 does not show every possible combination of components in such a display system. For example, it is possible that existing or future display systems could include more or fewer components than shown in FIG. 2, or could arrange the components in a different relation to each other, or could use components that do not correspond literally to the components shown in FIG. 2 but are nevertheless functionally equivalent thereto. Moreover, other kinds of display systems than that shown in FIG. 2 could use backlighting, and could realize increased efficiency by use of pre-polarizing operations as discussed above in connection with illustrative embodiments of the invention.

Figure 6:
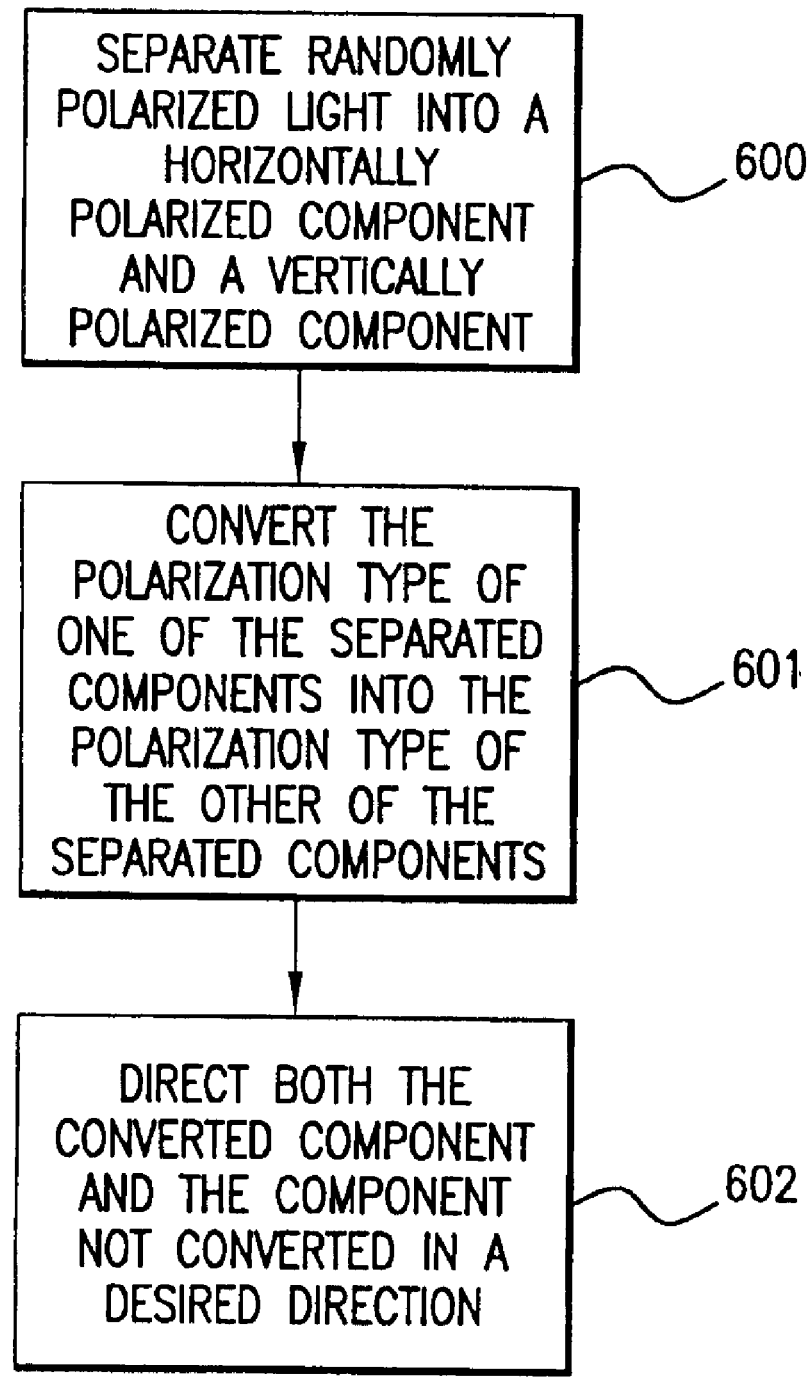
FIG. 6 illustrates a method according to embodiments of the invention.

For example, any kind of display system could benefit by application of the method for processing light, according to embodiments of the invention, as described below with reference to FIG. 6. The method includes separating randomly polarized light from a light source into a horizontally polarized component and a vertically polarized component, as shown in block 600. Then, the polarization type of one of the separated components may be converted into the polarization type of the other separated component, as shown in block 601. Both the component that is converted and the component that is not converted may be directed in a desired direction, as shown in block 602.

In block 601, the polarization type of one of the separated components could be converted into the polarization type of the other separated component by passing it through a half-wave plate. More specifically, the horizontally polarized component could be converted into vertically polarized light. In block 602, the separated component that is not converted may be reflected. More specifically, the vertically polarized component could be reflected, and both the vertically polarized component and the converted horizontally polarized component could be directed into a diffuser.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A device comprising:
    an elongated pre-polarizing element including an optically transparent material having
        an interlace therein to separate randomly polarized light into vertically polarized and horizontally polarized components;
        a re-polarizing layer thereon to change a polarization of a first one of the separated components; and
        a reflective edge to reflect a second one of the separated components;
        the device further comprising a diffuser, wherein the elongated pre-polarizing element is arranged along an edge of the diffuser.

2. The device of claim 1, wherein the reflective edge is disposed at an angle substantially parallel to the interface.

3. The device of claim 1, wherein the optically transparent material is constituted at least in part by a box prism.

4. The device of claim 1, wherein the re-polarizing layer is a half-wave plate.

5. The device of claim 1, wherein the first one of the separated components is the horizontally polarized component, and the second one of the separated components is the vertically polarized component.

6. A device comprising:
   an elongated pre-polarizing element including an optically transparent material having:
      an interface therein;
      a first outer edge, the interface being at a pre-determined angle with respect to the first outer edge;
      a second outer edge having a re-polarizing layer thereon; and
      a third outer edge having a reflective material thereon;
   the device further comprising a diffuser, wherein the elongated pre-polarizing element is arranged along an edge of the diffuser.

7. The device of claim 6, wherein the pre-determined angle is approximately equal to Brewster's angle for the material.

8. The device of claim 6, wherein the optically transparent material is constituted at least in part by a box prism.

9. The device of claim 6, wherein the re-polarizing layer is a half-wave plate.

10. An electronic display system comprising:
    a light source;
    a diffuser; and
    a device arranged between the light source and the diffuser, the device including an elongated pre-polarizing element including an optically transparent material having
       an interface therein to separate randomly polarized light into vertically polarized and horizontally polarized components;
       a re-polarizing layer thereon to change a polarization of one of the separated components; and
       a reflective edge to reflect the other separated component;
       wherein the elongated pre-polarizing element is arranged along an edge of the diffuser.

11. The electronic display system of claim 10, further comprising a vertical polarizer.

12. The electronic display system of claim 10, further comprising a horizontal polarizer.

13. The electronic display system of claim 10, further comprising liquid crystal.

14. The electronic display system of claim 10, further comprising color absorption filters.

15. A device for polarizing light in an electronic display system, comprising:
    diffusing means;
    first means to pass horizontally polarized light in randomly polarized light from a light source, while reflecting vertically polarized light in the randomly polarized light;
    second means to convert the horizontally polarized light passed by the first means into vertically polarized light; and
    third means to direct the vertically polarized light reflected by the first means in a pre-determined direction;
    wherein the first, second and third means are formed as an elongated member arranged along an edge of the diffusing means.

16. The device of claim 15, wherein the first means comprises a box prism.

17. The device of claim 15, wherein the second means comprises a half-wave plate.

18. A method for processing light in an electronic display system, comprising:
    (i) arranging a diffuser and an elongated pre-polarizing element adjacent to a light source, wherein the elongated pre-polarizing element is disposed along an edge of the diffuser;
    (ii) separating randomly polarized light from the light source using the elongated pre-polarizing element into a horizontally polarized component and a vertically polarized component;
    (iii) converting the polarization type of a first one of the separated components into the polarization type of a second one of the separated components; and
    (iv) directing both the converted component and the component not converted toward the diffuser.

19. The method of claim 18, wherein (ii) comprises passing the randomly polarized light through an optically transparent material of the elongated pre-polarizing element having an interface therein to separate randomly polarized light into vertically polarized and horizontally polarized components.

20. The method of claim 18, wherein (iii) comprises passing the first one of the separated components through a half-wave plate.

21. The method of claim 18, wherein (iv) comprises reflecting the second one of the separated components toward the diffuser.

\* \* \* \* \*